Aug. 7, 1962 H. N. HOVLAND ET AL 3,048,320
DISPENSING CARTON

Filed April 27, 1960 9 Sheets-Sheet 1

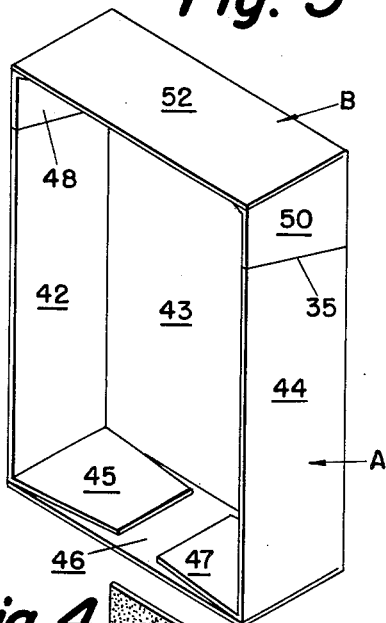
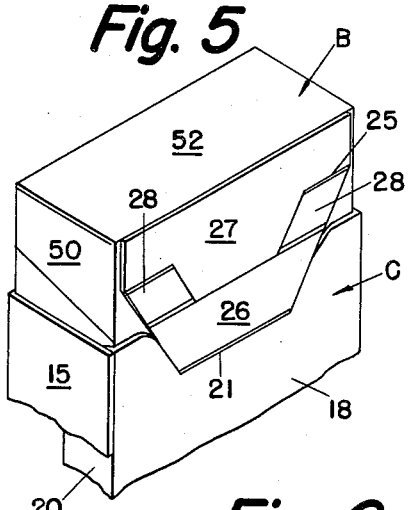
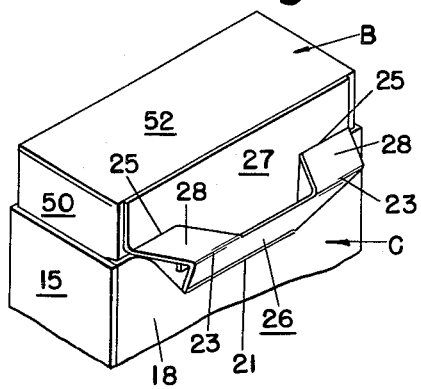
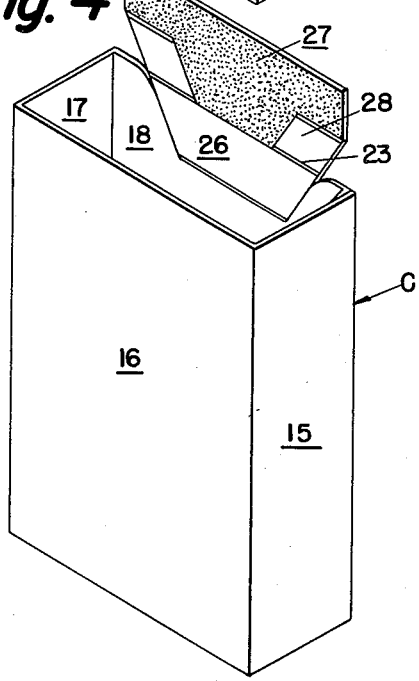
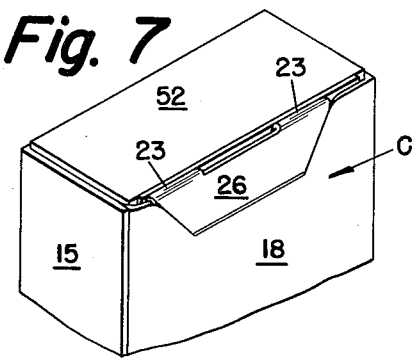

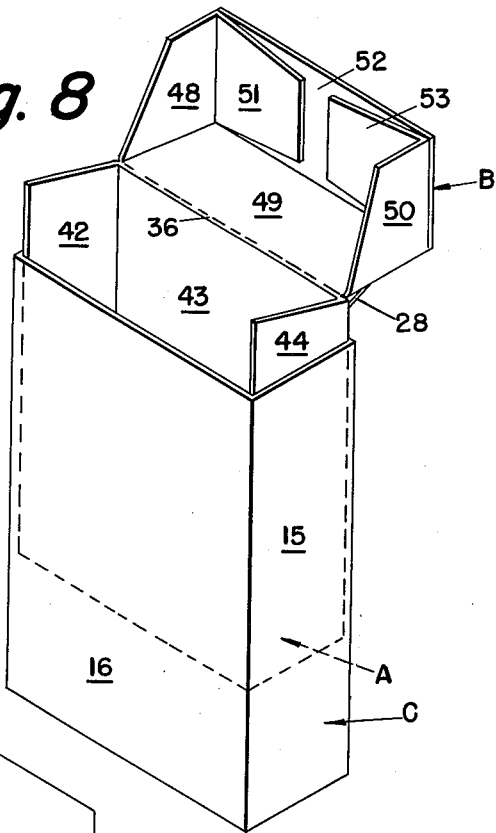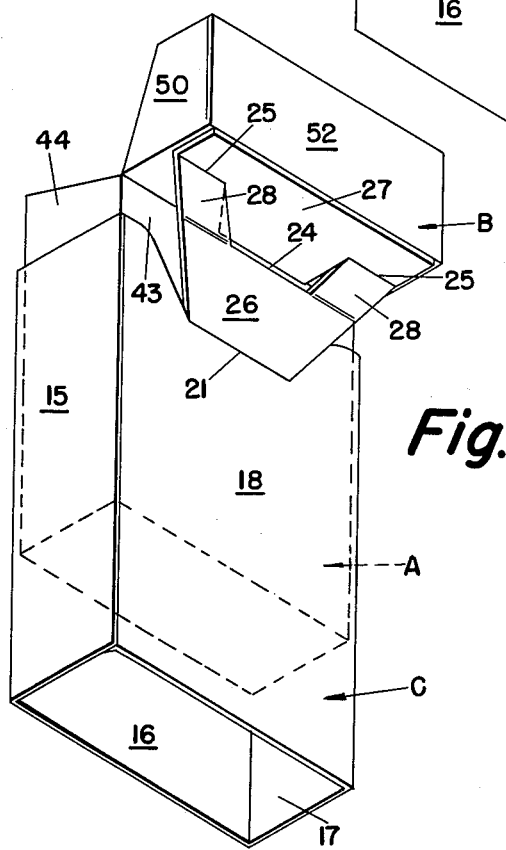

Aug. 7, 1962 H. N. HOVLAND ET AL 3,048,320
DISPENSING CARTON
Filed April 27, 1960 9 Sheets-Sheet 5

Aug. 7, 1962 H. N. HOVLAND ET AL 3,048,320
DISPENSING CARTON
Filed April 27, 1960
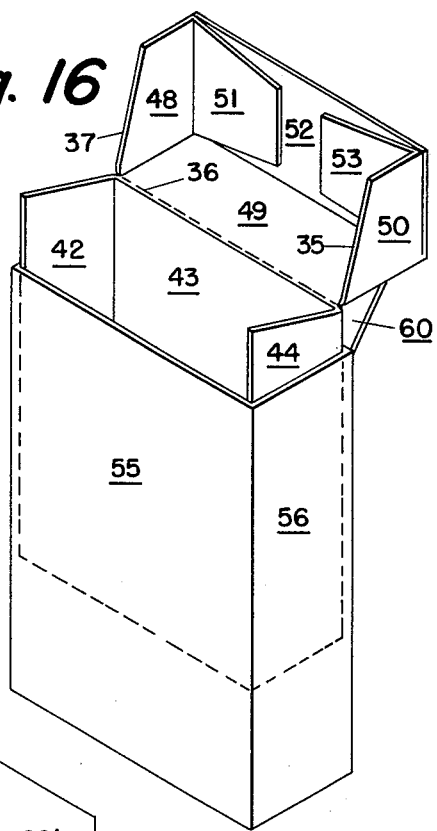
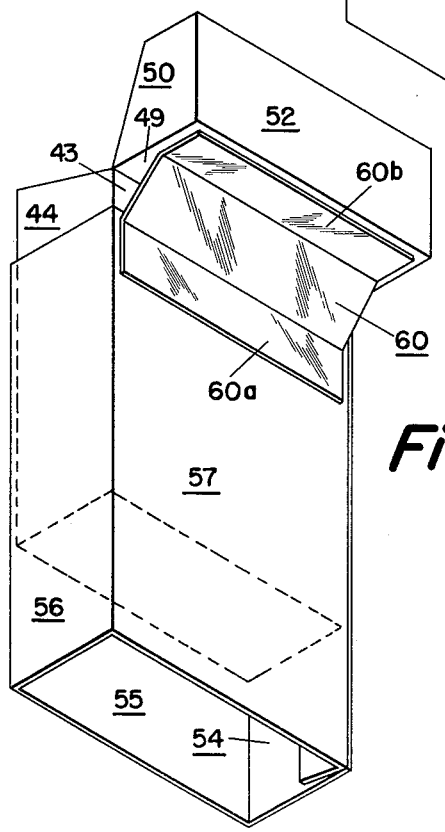

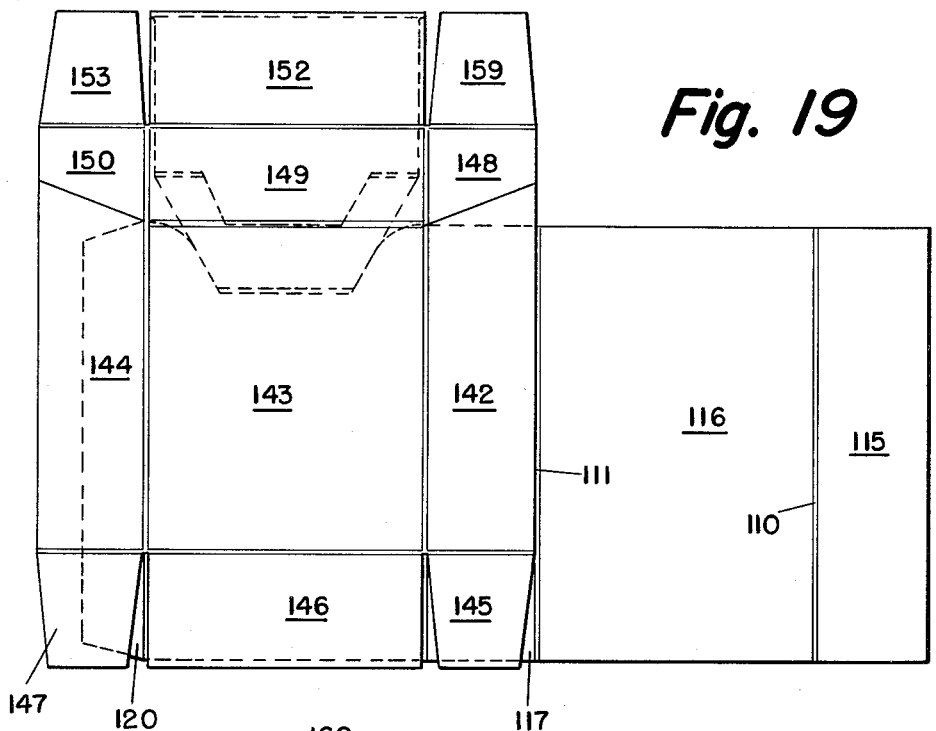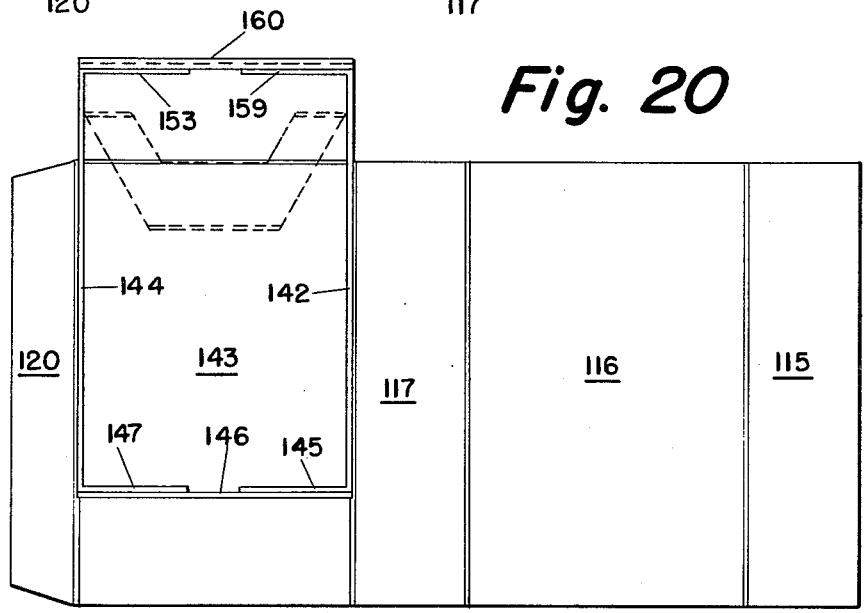

Aug. 7, 1962  H. N. HOVLAND ET AL  3,048,320
DISPENSING CARTON
Filed April 27, 1960  9 Sheets-Sheet 9

United States Patent Office 3,048,320
Patented Aug. 7, 1962

3,048,320
DISPENSING CARTON
Howard N. Hovland and Merle A. Wichman, Appleton, Wis., assignors to American Can Company, New York, N.Y., a corporation of New Jersey
Filed Apr. 27, 1960, Ser. No. 25,102
3 Claims. (Cl. 229—20)

This invention relates to a dispensing carton comprising a receptacle portion which is slidably and telescopically received in a tubular sleeve. The receptacle is provided with a hinged lid at its upper portion which is suitably connected to the sleeve so that when the receptacle portion is moved out of the sleeve, the lid will be automatically opened for permitting access to the contents placed within the receptacle portion, and when the receptacle portion is retracted within the sleeve portion, the hinged lid will be automatically reclosed.

The novel features of this invention may be embodied in various exemplary forms. Three specific embodiments are illustrated in the following description and accompanying drawings, wherein—

Figure 1:
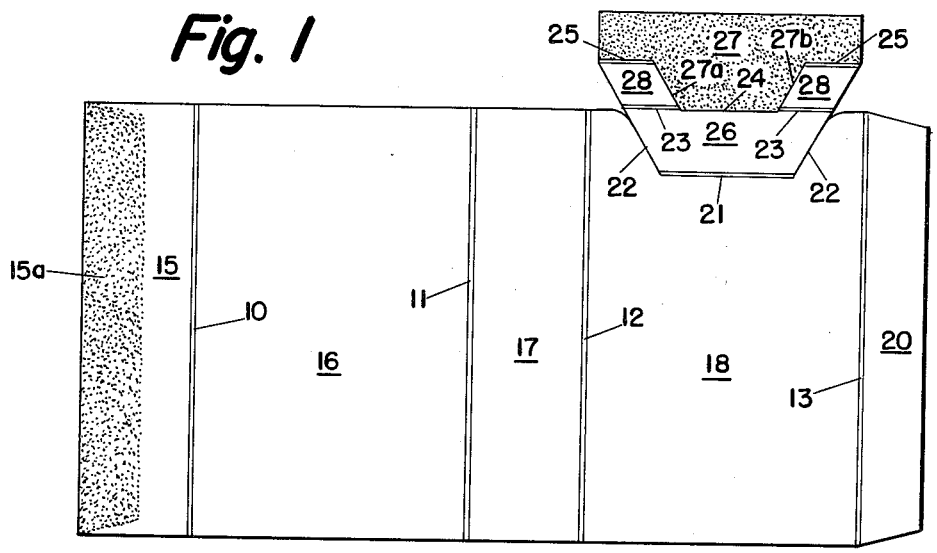
Figure 2:
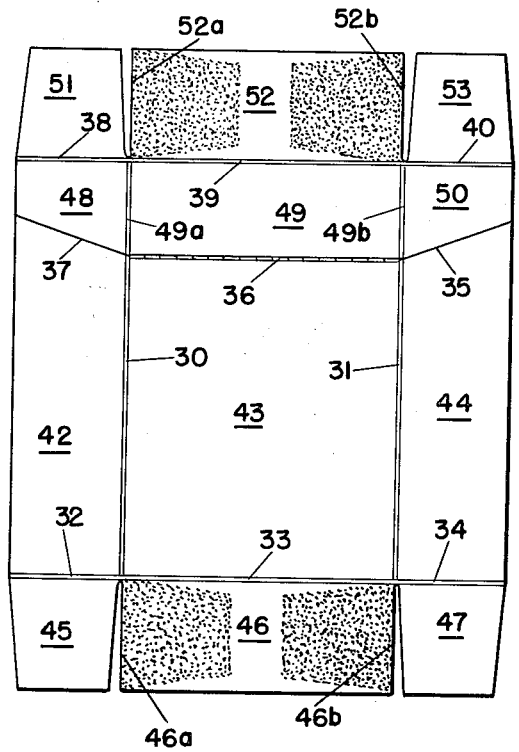

FIGURE 1 is a plan view of a blank suitably cut and scored to provide a receptacle portion, FIGURE 2 is a plan view of a blank suitably cut and scored to provide a sleeve portion, FIGURE 3 is a perspective view of a receptacle portion formed from the blank shown in FIGURE 2, FIGURE 4 is a perspective view of a sleeve formed from the blank shown in FIGURE 1, FIGURE 5 is a fragmental perspective view showing the receptacle portion received within the sleeve portion and connected thereto, FIGURE 6 is a view similar to FIGURE 5 showing the receptacle portion being partially retracted within the sleeve portion, FIGURE 7 is a view similar to FIGURE 5 showing the receptacle portion being completely retracted within the sleeve portion and the lid in closed position, FIGURE 8 is a front perspective view of the carton showing the receptacle portion moved out of the sleeve portion and the hinged cover in opened position to permit access to the contents within the receptacle portion, and FIGURE 9 is a rear perspective view of the opened carton shown in FIGURE 8.

FIGURES 10 to 17, inclusive, illustrate another modified embodiment of the invention, wherein—

Figure 10:
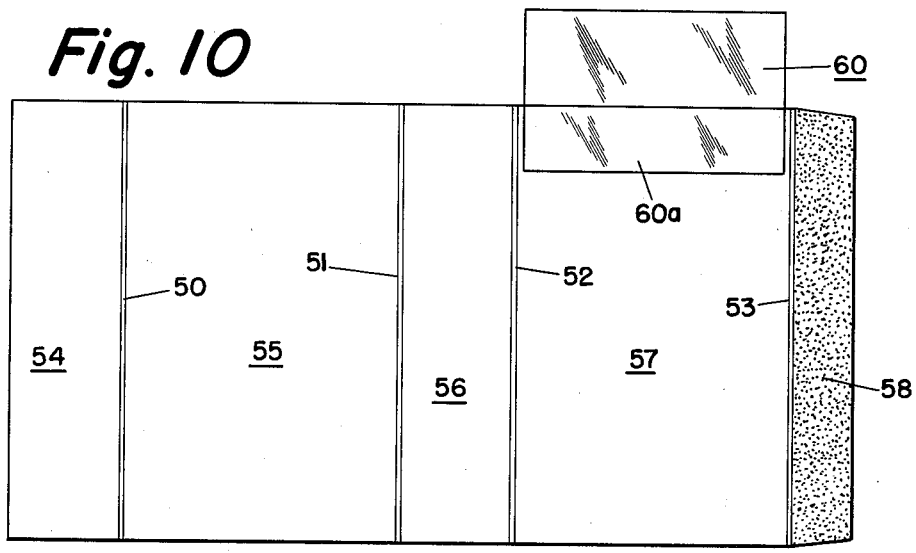
Figure 11:
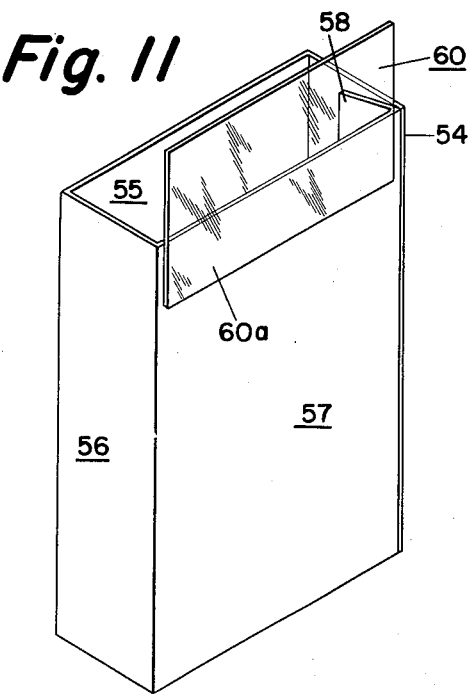
Figure 12:
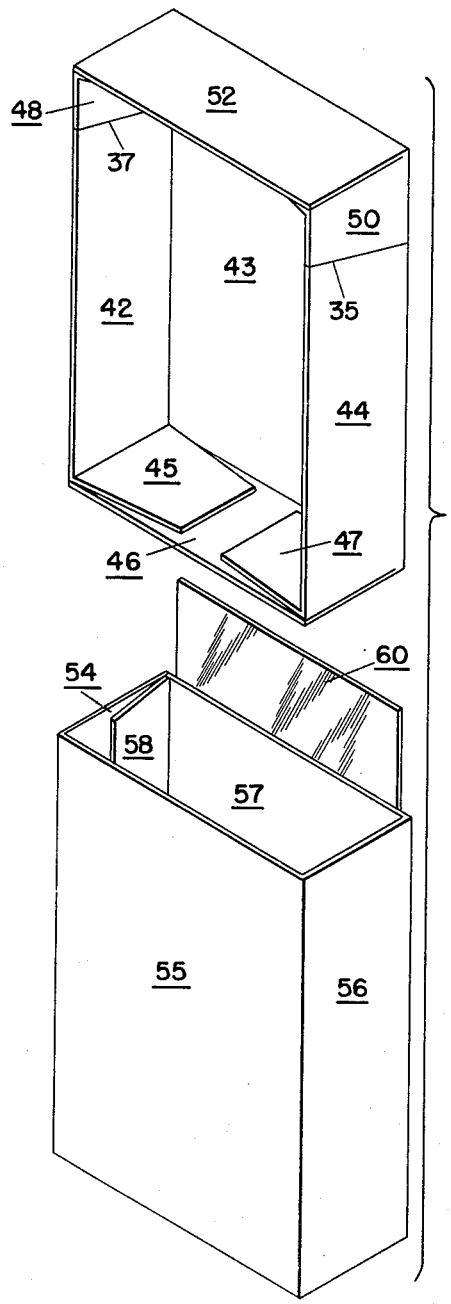
Figure 13:
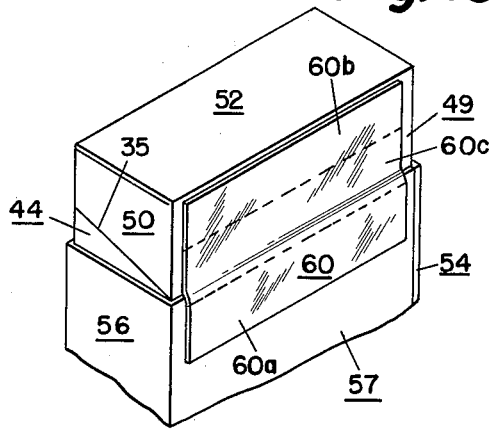
Figure 14:
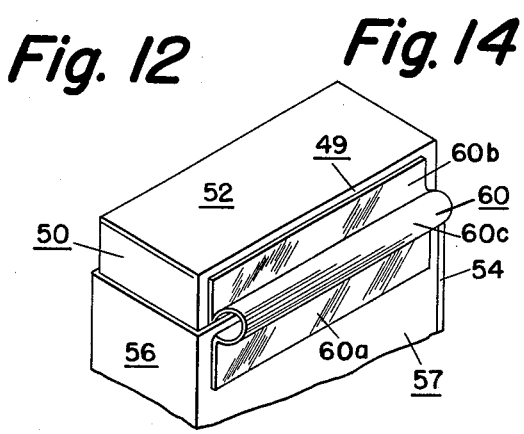
Figure 15:
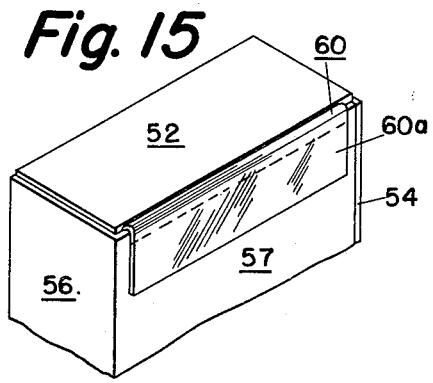

FIGURE 10 is a plan view of a blank suitably cut and scored for forming a sleeve portion, FIGURE 11 is a perspective view of the sleeve portion formed from the blank shown in FIGURE 10, FIGURE 12 is an exploded perspective view of the sleeve portion shown in FIGURE 11 adjacent a receptacle portion, similar to the one shown in FIGURE 3, for forming the completed carton, FIGURE 13 is a fragmental perspective view showing the receptacle portion received within the sleeve portion and connected thereto, FIGURE 14 is a fragmental perspective view similar to FIGURE 13 showing the receptacle portion in partially retracted position within the sleeve portion, FIGURE 15 is a view similar to FIGURE 14 showing the receptacle portion in completely retracted position within the sleeve portion with the lid closed, FIGURE 16 is a front perspective view showing the assembled carton constructed according to the elements shown in FIGURES 10 to 15 having the lid in opened position, and FIGURE 17 is a rear perspective view of the opened carton shown in FIGURE 16.

A third modification of the carton construction is shown in FIGURES 18 to 25, wherein—

Figure 18:
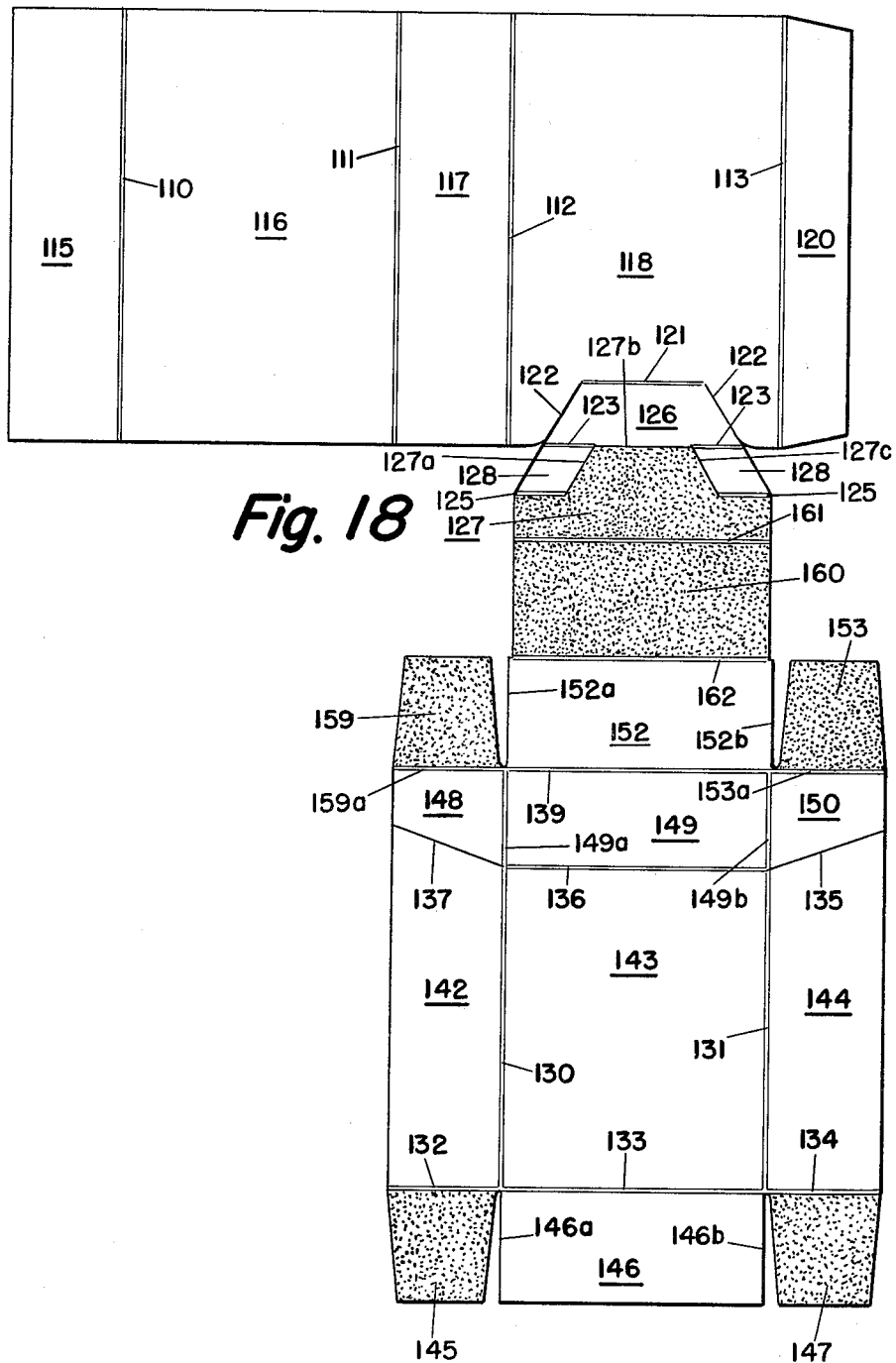

FIGURE 18 illustrates a plan view of a single blank for forming both the receptacle and the sleeve portions of the dispensing carton, FIGURE 19 is a plan view showing one stage in forming the carton from the blank of FIGURE 18.

Figure 21:
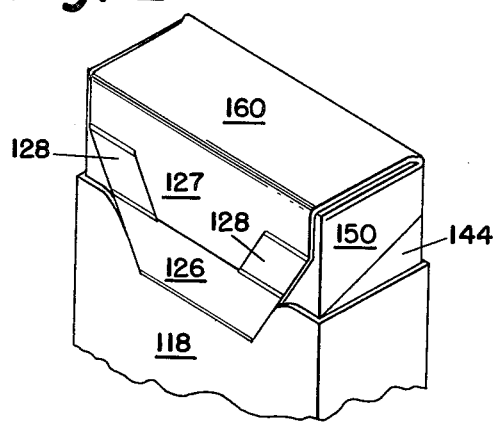
Figure 22:
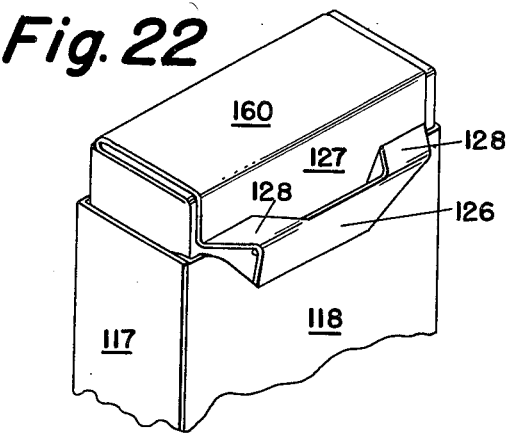
Figure 23:
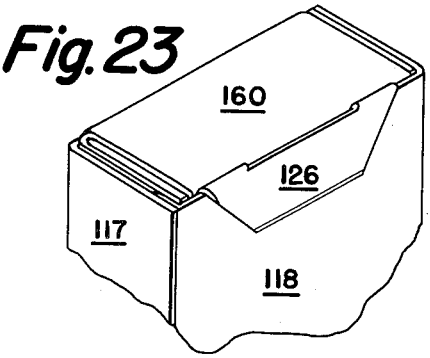
Figure 24:
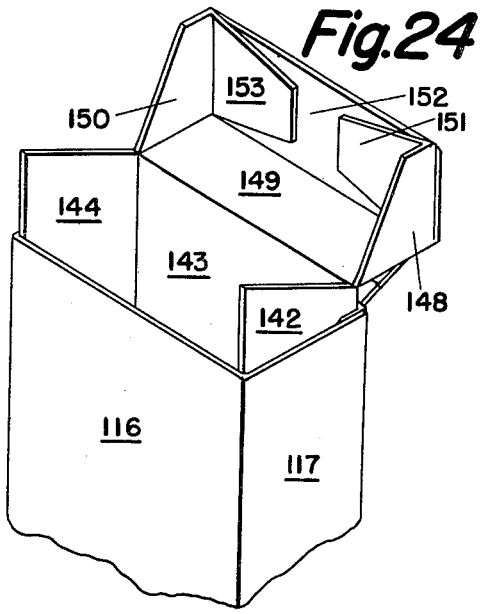
Figure 25:
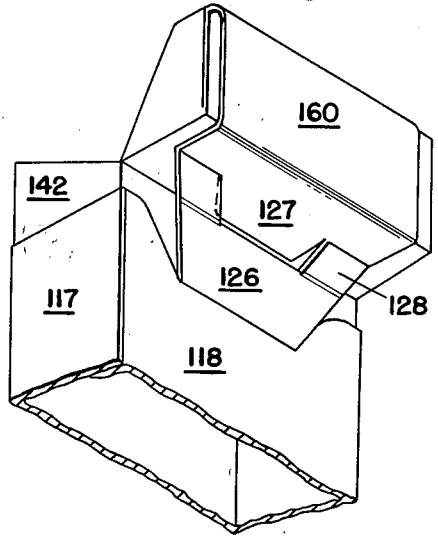

FIGURE 20 is a later stage in forming the carton from the blank illustrated in FIGURE 18, FIGURE 21 is a fragmental perspective rear view showing the carton formed from the blank of FIGURE 18 in assembled condition, the receptacle portion being partially received within the sleeve portion, FIGURE 22 is a fragmental perspective view similar to FIGURE 21 showing the receptacle portion in partially retracted condition within the sleeve portion, FIGURE 23 is a similar view to FIGURE 22 showing the receptacle portion in fully retracted condition within the sleeve portion with the lid completely closed, FIGURE 24 is a fragmental front perspective view showing the carton formed from the blank of FIGURE 18 in opened position, and FIGURE 25 is a fragmental perspective view of the rear of the opened carton shown in FIGURE 24.

Referring to the embodiment of the invention illustrated in FIGURES 1 to 9 inclusive, the dispensing carton is formed from two separate blanks, FIGURE 1 illustrating the blank from which the receptacle portion A of the carton is formed, and FIGURE 2 illustrating the blank from which the sleeve portion C is formed. The respective blanks may be formed from any suitable material, such as cardboard, plastic sheet material, metal foil and the like. The blank shown in FIGURE 1 for forming the sleeve portion C is provided with score lines 10, 11, 12 and 13 which form a front wall 16, a rear wall 18, and side walls 15 and 17, respectively. A glue panel 20 is hinged to the rear wall 18 along score line 13 and is adapted to be adhesively attached to the side wall 15 by any suitable means, such as by adhesive 15a, shown in FIGURE 1. The rear wall 18 is provided with a hinged panel 26 hinged thereto along hinge line 21. The hinged panel 26 is separated from the rear wall along spaced cut lines 22. The hinged panel 26 is provided with cut lines 24, 27a and 27b and spaced score lines 25, thereby forming a connecting panel 27 which is hinged to panel 26 along spaced score lines 23. Spaced score lines 25 provide foldable connecting elements 28 whose function will be described later.

The blank shown in FIGURE 2 for forming the receptacle portion A and hinged lid portion B is scored along score lines 30 and 31 to provide a rear wall 43 and side walls 42 and 44 hinged thereto along the respective hinge lines 30 and 31. The rear wall 43 is provided with score lines 33 and 36, thereby forming a rear lid panel portion 49 hinged thereto at its upper end and a lower closure panel 46 hinged thereto along score line 33. A bottom glue flap 45 is hinged to side wall 42 along score line 32. A bottom glue flap 47 is hinged along score line 34 to side wall 44. Lid panel 49 and the elements connected thereto provide a hinged lid portion B. Panel 49 is provided with lid side flaps 48 and 50 hinged respectively along score lines 49a and 49b. The side flap 48 is separated from side panel 42 along cut line 37, and flap 50 is separated from the side panel 44 along cut line 35. Glue flap 51 is hinged to lid flap 48 along score line 38. A glue flap 53 is hinged along score line 40 to lid side flap 50. A top lid panel 52 is hinged along score line 39 to rear lid panel 49. The rear lid panel 52 is separated from the glue flaps 51 and 53 by cut lines 52a and 52b, respectively.

The receptacle portion A is formed from the blank shown in FIGURE 2 by folding the side walls 42 and 44 at right angles to the rear wall 43, as shown in FIGURE 3, and adhering glue flaps 45 and 47 to the lower closure panel 46. In forming the hinged lid C, glue lid flaps 51 and 53 are adhered to the overlapped portions of top lid panel 52. The rear wall 43 and side walls 42 and 44 form a receptacle portion A for retaining any suitable articles therein, and the upper panels previously described form a lid B which is hinged along score line 36 to the rear wall 43 of the receptacle portion.

In forming the completed dispensing carton, the receptacle A with its lid B, as shown in FIGURE 3, is inserted within the sleeve C in the position shown in FIGURE 5. The connecting panel 27 is adhered or suitably fastened to the exposed surface of rear lid panel 49 of the hinged lid B so as to assume the position as shown in FIGURE 5. Upon moving the receptacle portion A within the sleeve portion C inwardly, as shown in FIGURE 6, the connecting foldable elements 28 will be hinged outwardly along their respective spaced score lines 23 and upon further movement of the receptacle portion within the sleeve portion into final closed position, as shown in FIGURE 7, the connecting elements 28 will be completely folded over and positioned within the sleeve portion C and will be tucked in between the connecting panel 27 and rear wall 18 of the sleeve portion C and will not be visible except for the hinge lines 23, as shown in FIGURE 7. As shown in FIGURES 1, 5, 6 and 7, the vertical height of elements 28 is essentially equal to the height of the lateral edge portions of panel 27 between score lines 25 and the upper edge thereof. From FIGURES 5, 6 and 7, it is readily apparent that the upper edge of panel 27 essentially coincides with the upper edge of the lid rear panel. These relationships are necessary to insure that the top of lid B when in closed position coincides with the upper edge of the tubular sleeve. At the same time, hinged panel 26 will be brought into alignment with the rear wall 18 and will be positioned substantially in the same plane therewith, as shown in FIGURE 7.

The function of the foldable connecting elements 28 is made more clear by referring to FIGURES 8 and 9, which illustrate the carton in opened position with the lid portion B hinged outwardly by the action of the connecting elements 28 previously described. When the receptacle portion A is moved upwardly within the sleeve portion C, as shown in FIGURE 9, the hinged lid portion B will be automatically opened and folded rearwardly by the pulling force exerted by the connecting elements 28. When it is desired to reclose the carton, the receptacle portion A is withdrawn within the sleeve portion by merely manually pushing the hinged cover portion B back into closed position and then pushing downwardly over the receptacle portion A so that it is in alignment with the receptacle portion A and then pushing the two together within the sleeve portion C into final closed position, as shown in FIGURE 7.

It will be obvious that this construction permits easy opening of the carton so as to permit access to the contents positioned within the receptacle portion. The carton can also be easily reclosed as described previously. The materials from which the carton is formed are, of course, of sufficient strength so as to permit repeated opening and reclosing until the contents are used up.

A second specific embodiment of my invention is illustrated in FIGURES 10 to 17, inclusive. Referring to FIGURE 10, there is illustrated a plan view of a blank formed of suitable material, such as cardboard and the like, for providing the sleeve portion of the dispensing carton. The blank is scored along lines 50, 51, 52 and 53 to provide a front wall 55, a rear wall 57 and side walls 54 and 56, respectively, which are connectedly hinged together. A glue panel 58 is hinged along score line 53 to rear wall 57. A flexible connecting member 60 is adhered to the rear wall 57. It may be formed, for example, from paper, cellophane, polyethylene, and the like. One portion of the connecting member 60 is adhered in the area indicated by numeral 60a to the rear wall 57 so as to have an extending portion 60. In forming the sleeve, the glue panel 58 is adhered to the inner overlapped portion of side wall 54 to form the sleeve as shown in FIGURE 11. The receptacle portion shown in FIGURE 12 is formed from a blank similar to that shown in FIGURES 2 and 3 and is designated by the same numerals. It will be seen that the receptacle portion also has a hinged lid portion as previously described. The completed dispensing carton is formed by inserting the receptacle portion within the sleeve portion and then suitably attaching the free unattached portion of connecting member 60 to the rear lid panel 49 of the hinged lid as shown in FIGURE 13. The area 60b is attached to the rear lid panel 49 by any suitable adhesive while the intermediate rectangular area 60c is unattached. The receptacle portion is then pushed downwardly so as to assume the position shown in FIGURE 14 and then to its final closed position as shown in FIGURE 15. It will be seen that when the receptacle portion is positioned within the sleeve, as shown in FIGURE 14, the unadhered portion 60c of the connecting element will be folded outwardly and will then be folded within the sleeve portion and brought into contact with the rear wall 57 of the sleeve portion, as shown in FIGURE 15.

When it is desired to have access to the contents packaged within the carton, the receptacle portion is merely pushed outwardly by pushing upwardly on the bottom panel 46 of the receptacle portion with a finger so that it will be slide upwardly and out of the sleeve portion to assume the position shown in FIGURES 16 and 17. At the same time the pulling action of the connecting element 60 will cause the lid to be hinged outwardly along its hinge line 36, as shown in FIGURE 16, whereby access to the contents within the receptacle portion is permitted. When it is desired to reclose the carton, the hinged lid is merely folded back so as to position it over the top of the receptacle portion and the aligned receptacle and lid are then pushed downwardly manually so as to position the receptacle and the lid wholly within the sleeve portion into final closed position, as shown in FIGURE 15.

A third embodiment of the invention is illustrated in FIGURES 18 to 25, wherein FIGURE 18 shows a single blank from which both the receptacle portion and the sleeve portion are formed. Essentially, the construction is similar to that illustrated in FIGURES 1 to 9 except that the elements are formed from a single blank. The blank is provided with score lines 110, 111, 112 and 113 which form the wall portions of the sleeve portion of the carton having the front wall 116, a rear wall 118 and side walls 115 and 117 which are respectively hinged to each other, and a glue panel 120 which is adapted to be adhered to the overlapped portion of side panel 115. A connecting panel 126 is hinged to rear wall 118 along hinge line 121 and separated therefrom along spaced cut lines 122. Connecting panel 126 is provided with cut lines 127a, 127b and 127c and also spaced score lines 123 which form a connecting glue panel 127. Panel 127 is hinged to a second connecting glue panel 160 along score line 161. Panel 160 is hinged to a panel 152 along score line 162 which in turn is hinged to panel 149 along score line 139. Panel 160 is hinged to a rear wall 143 along score line 136 and in turn is hinged to a bottom closure panel 146 along score line 133. Panel 149 is provided with side glue flaps 148 and 150 which are hinged thereto respectively along score lines 149a and 149b. Glue flap 159 is hinged to flap 148 along score line 159a and glue flap 153 is hinged to flap 150 along score line 153a. Flaps 153 and 159 are separated from the panel 152 along cut lines 152a and 152b, respectively. Side wall 142 is separated from the flap 148 by cut line 137. Side wall 144 is separated from the flap 150 by cut line 135. A bottom glue flap 145 is hinged to side wall 142 along score line 132. A bottom glue flap 147 is hinged to side wall 144 along score line 134. The bottom closure panel 146 is separated from bottom glue flap 145 by cut line 146a. The bottom closure panel 146 is also separated from bottom glue flap 147 by cut line 146b.

In forming the dispensing carton from the blank as described, panel 152 and panels 149, 143 and 146 connected thereto are folded over along score line 162 and superimposed on the wall 118, as shown in FIGURE 19. Side walls 142 and 144 are then folded at right angles to wall 143 and glue flaps 145 and 147 are then adhesively secured to the bottom panel 146. Glue flaps 153 and 159 of the hinge cover are then adhesively secured to the top lid panel 152. The connecting glue panel 127 is then adhered to the rear lid panel 149 and extending panel 117 is folded up along score line 112 together with connected panels 116 and 115 which are then brought around forwardly of the set-up receptacle portion. Glue panel 120 is then adhered to side panel 115, thereby completing the sleeve portion and the carton is now in completely assembled form. The function of the various parts previously described is identical to that described in connection with the embodiment shown in FIGURES 1 to 9. The foldable connecting elements 128 serve to actuate the hinging of the cover into open and closed position exactly as described in connection with FIGURES 1 to 9. This action is illustrated in FIGURES 21 to 25. When the receptacle is partially moved outwardly of the sleeve portion, it will assume the position shown in FIGURE 21, and when it is pushed downwardly further within the sleeve portion, the connection portions 128 will be folded inwardly and internally against the panel portion 127 and then will be completely out of sight as shown in FIGURE 23. When the carton is opened by pushing the bottom panel 146 upwardly, the lid will automatically be hinged open, as shown in FIGURES 24 and 25, so as to permit access to the contents within the receptacle. When it is desired to reclose the carton, the hinged cover is merely pushed by the fingers in alignment with the side walls 142 and 144 of the receptacle portion and then further within the sleeve portion until it is completely closed to assume the position shown in FIGURE 23.

The dispensing carton made in accordance with the present invention is suitable for packaging any desired articles, such as cigarettes, or other items which are used one at a time, or a few at a time, so that the remaining items are retained within the receptacle portion and can be retained therein by closing of the lid and when further access is required, the package can readily be opened as previously described.

Further modifications and changes may be made embodying the basic principle of this invention which will be apparent to those skilled in the art. Such modifications are intended to be included within the scope of the appended claims.

We claim:

1. A dispensing carton comprising a slidable rectangular receptacle portion formed of a blank cut and scored to provide rear and side walls, end flaps hinged to said walls and forming a bottom wall; a lid hinged to the upper edge of said rear wall, said lid comprising lid rear and top walls and side flanges; said receptacle being slidably received in a tubular sleeve, said sleeve comprising front, rear and side walls, and integral lid-actuating means hingedly connected to the rear wall intermediate the top and bottom edges of said sleeve only along a score line including a first panel intermediate the hinge connection to the sleeve rear wall and the upper edge of the rear wall, connecting elements hingedly connected along score lines to the upper edge of the first panel adjacent the side edges thereof, a second panel hingedly connected along score lines adjacent the side edges thereof to the edges of the connecting elements opposite the first panel and to the upper marginal surface of said lid rear wall with the upper edges of the panel and the lid rear wall essentially coinciding, the perpendicular distance between the score lines connecting said connecting elements to said first and second panels being essentially equal to the perpendicular distance between the score lines connecting said second panel to the connecting elements and the upper edge thereof; said lid upon movement of said receptacle portion out of the tubular sleeve being hinged open, and upon retracting said receptacle portion within said sleeve being returned to closed position with the lid-actuating means infolded to position the connecting elements and second panel internally of the tubular sleeve.

2. A dispensing carton comprising a slidable rectangular receptacle portion formed of a blank cut and scored to provide rear and side walls, end flaps hinged to said walls and forming a bottom wall; a lid hinged to the upper edge of said rear wall, said lid comprising lid rear and top walls and side flanges; said receptacle being slidably received in a tubular sleeve, said sleeve being formed of a blank suitably cut and scored to provide front, rear and side walls, and integral lid-actuating means hingedly connected to the rear wall intermediate top and bottom edges of said sleeve only along a score line terminating appreciably inwardly of the side edges of the sleeve rear wall including a first panel intermediate the hinge connection to the sleeve rear wall and the upper edge of the rear wall, connecting elements hingedly connected along score lines to the upper edge of the first panel adjacent the side edges thereof, a second panel hingedly connected along score lines adjacent the side edges thereof to the edges of the connecting elements opposite the first panel and to the upper marginal surface of said lid rear wall with the upper edges of the panel and the lid rear wall essentially coinciding, the perpendicular distance between the score lines connecting said connecting elements to said first and second panels being essentially equal to the perpendicular distance between the score lines connecting said second panel to the connecting elements and the upper edge thereof; said lid upon movement of said receptacle portion out of the tubular sleeve being hinged open, and upon retracting said receptacle portion within said sleeve being returned to closed position with the lid-actuating means infolded to position the connecting elements and second panel internally of the tubular sleeve.

3. A display carton formed of a single blank suitably cut and scored comprising a slidable rectangular receptacle portion including rear and side walls, end flaps hinged to said walls and forming a bottom wall; a lid hinged to the upper edge of said rear wall, said lid comprising lid rear and top walls, top wall and side flanges; said receptacle being slidably received in a tubular sleeve, said sleeve comprising front, rear and side walls, and integral lid actuating means hingedly connected to the rear wall intermediate the top and bottom edges of said sleeve only along a score line terminating appreciably inwardly of the side edges of the sleeve rear wall and including a first panel intermediate the hinge connection to the sleeve rear wall and the upper edge of the rear wall, connecting elements hingedly connected along score lines to the upper edge of the first panel adjacent the side edges thereof, a second panel hingedly connected along score lines adjacent the side edges thereof to the edges of the connecting elements opposite the first panel and to the upper marginal surface of said lid rear wall with the upper edges of the panel and the lid rear wall essentially coinciding, the perpendicular distance between the score lines connecting said connecting elements to said first and second panels being essentially equal to the perpendicular distance between the score lines connecting said second panel to the connecting elements and the upper edge thereof; a connecting panel hingedly connected to the top wall of said lid and to the said second panel, said lid upon movement of said receptacle portion out of the tubular sleeve being hinged open, and upon retracting said receptacle portion within said sleeve being returned to closed position with the lid-actuating means infolded to position the connecting elements and second panel internally of the tubular sleeve.

References Cited in the file of this patent

UNITED STATES PATENTS

| | | |
|---|---|---|
| 1,962,468 | Stein | June 12, 1934 |
| 2,358,802 | Glover | Sept. 26, 1944 |
| 2,919,845 | Hackmyer | Jan. 5, 1950 |
| 2,597,810 | Myers | May 20, 1952 |
| 2,950,060 | Von Rudeen | Aug. 23, 1960 |